United States Patent
Lin et al.

(10) Patent No.: US 8,869,942 B2
(45) Date of Patent: Oct. 28, 2014

(54) LUBRICATING DEVICE WITH HEATING FUNCTION

(75) Inventors: Ming-Yao Lin, Taichung (TW); Zong-Sian Jiang, Taichung (TW); Fu-Chun Huang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 427 days.

(21) Appl. No.: 13/292,275

(22) Filed: Nov. 9, 2011

(65) Prior Publication Data

US 2013/0112503 A1 May 9, 2013

(51) Int. Cl.
*F16N 39/04* (2006.01)
*F16N 7/12* (2006.01)

(52) U.S. Cl.
CPC . *F16N 39/04* (2013.01); *F16N 7/12* (2013.01)
USPC .......................................................... 184/6.22

(58) Field of Classification Search
CPC ................................... F16N 7/12; F16N 39/04
USPC ............... 184/6.22, 7.1, 6.14, 64, 55.1, 55.2; 74/89.22; 384/13
See application file for complete search history.

(56) References Cited

U.S. PATENT DOCUMENTS

| | | | | |
|---|---|---|---|---|
| 4,077,492 A | * | 3/1978 | Inoue | 184/64 |
| 2007/0227281 A1 | * | 10/2007 | Chen et al. | 74/89.44 |
| 2008/0257082 A1 | * | 10/2008 | Chuo | 74/89.44 |
| 2011/0146430 A1 | * | 6/2011 | Chen et al. | 74/89.44 |
| 2012/0266703 A1 | * | 10/2012 | Chuo | 74/89.44 |
| 2013/0081490 A1 | * | 4/2013 | Chiang et al. | 74/89.44 |

* cited by examiner

*Primary Examiner* — William E Dondero
*Assistant Examiner* — Robert T Reese
(74) *Attorney, Agent, or Firm* — Muncy, Geissler, Olds & Lowe, P.C.

(57) ABSTRACT

A lubricating device with heating function is provided with a heat conduction member between the lubricating device and the movable member, the heat conduction member absorbs the heat generated by the motion of movable member and transmits the heat to the oil tank, so as to reduce the viscosity of the lubrication stored in the oil tank, and consequently, the heated and reduced-in-viscosity lubrication can easily be absorbed by the oil guiding member by capillary action. When the movable member stops moving, the temperature of the lubrication returns to normal and no capillary action will occur, therefore, the lubricating device is capable of controlling start and stop of the action of lubrication transmission by itself without using any other control device, and thus preventing lubrication leakage.

10 Claims, 9 Drawing Sheets

LUBRICATING DEVICE WITH HEATING FUNCTION

BACKGROUND OF THE INVENTION

1. Field of the Invention

The present invention relates to a lubricating device, and more particularly to a lubricating device with heating function used in cooperation with motion transmission device.

2. Description of the Prior Art

Referring to FIG. 1, a conventional linear guideway 10 is provided on a rail 11 thereof with an oil tank 12, between the oil tank 12 and a slide block 13 which is slidably mounted on the rail 11 is disposed an lubricating member 14, and between the oil tank 12 and the lubricating member 14 is disposed a connector 15 with an oil absorbing member 151. The oil absorbing member 151 absorbs oil from the oil tank 12 and transports it to the lubricating member 14, and finally the lubricating member 14 applies oil to the rail 11.

Referring to FIG. 2, a ball screw 20 is provided in its nut 22 with a lubricating member 23 with a protrusion 231 contacting the screw 21. The lubricating member 23 further comprises an oil absorbing member 232 for absorbing oil from an oil tank 24 attached to the nut 22, and then the lubricating member 23 applies the oil to the screw 21.

The oil absorbing members 151 and 232 of the linear guideway 10 and ball screw 20 are made of wool felt and absorb oil by capillarity. Oil will be continuously absorbed to do lubrication by the oil absorbing members 151, 232 no matter the nut 22 or the slide block 13 are moving or not, and therefore causing oil leakage.

The present invention has arisen to mitigate and/or obviate the afore-described disadvantages.

SUMMARY OF THE INVENTION

The primary object of the present invention is to provide a lubricating device with heating function, which is capable of heating the lubrication by using the heat generated by the movable member, so that, when the movable member is moving, capillarity action will occur and be used to carry out lubricating action.

To achieve the above object, the lubricating device with heating function in accordance with the present invention is provided with a heat conduction member between the lubricating device and the movable member, the heat conduction member absorbs the heat generated by the motion of movable member and transmits the heat to the oil tank, so as to reduce the viscosity of the lubrication stored in the oil tank, and consequently, the heated and reduced-in-viscosity lubrication can easily be absorbed by the oil guiding member by capillary action. When the movable member stops moving, the temperature of the lubrication returns to normal and no capillary action will occur, therefore, the lubricating device is capable of controlling start and stop of the action of lubrication transmission by itself without using any other control device, and thus preventing lubrication leakage.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
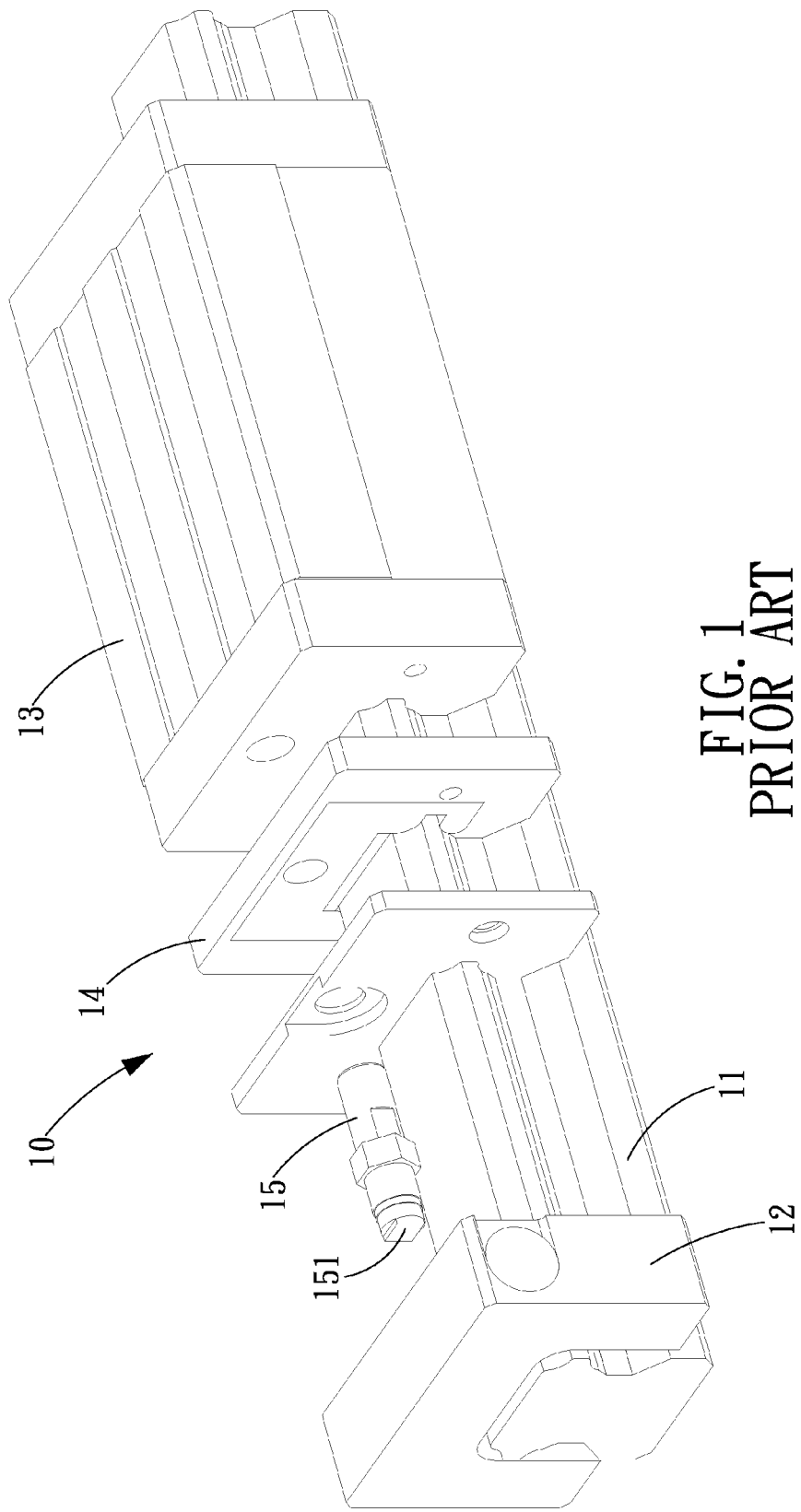
FIG. 1 shows a conventional lubricating device for a linear guideway.
Figure 2:
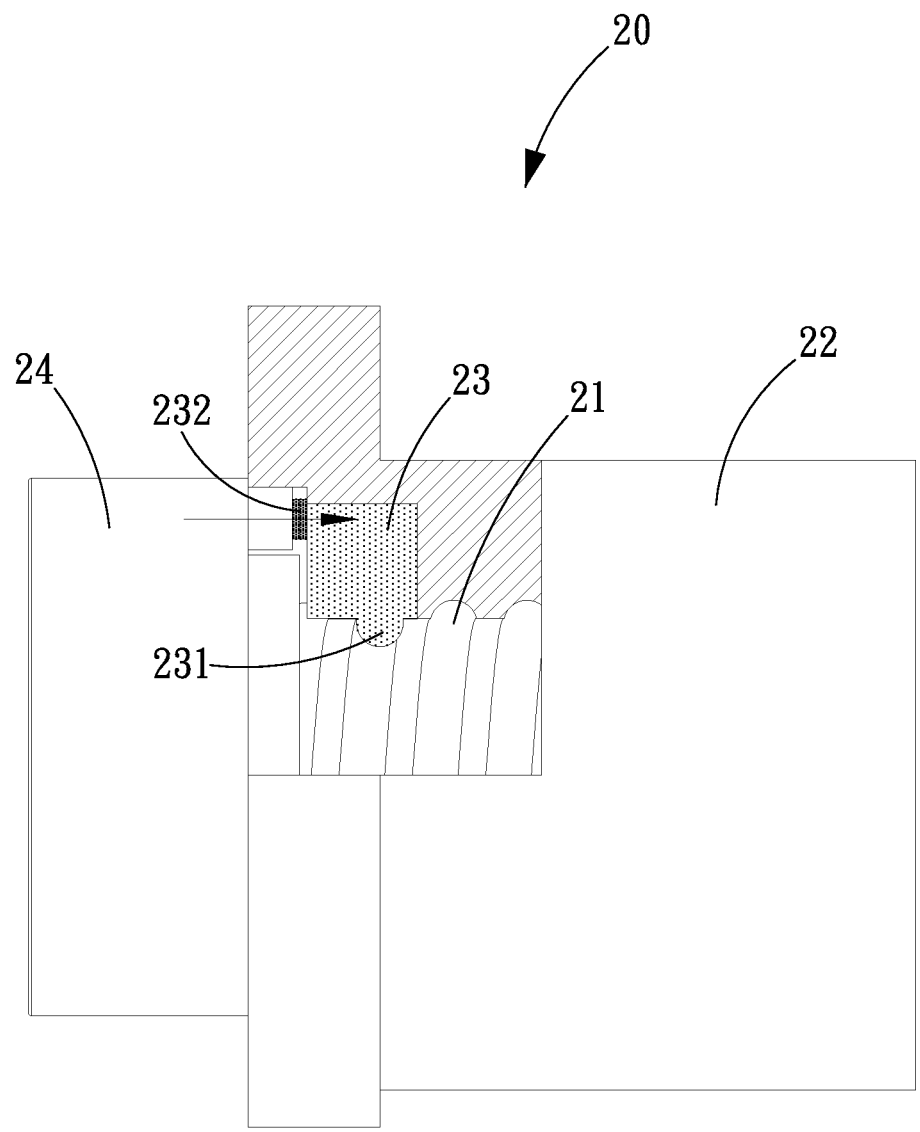
FIG. 2 is a cross sectional view of a conventional lubricating device for a ball screw.
Figure 3:
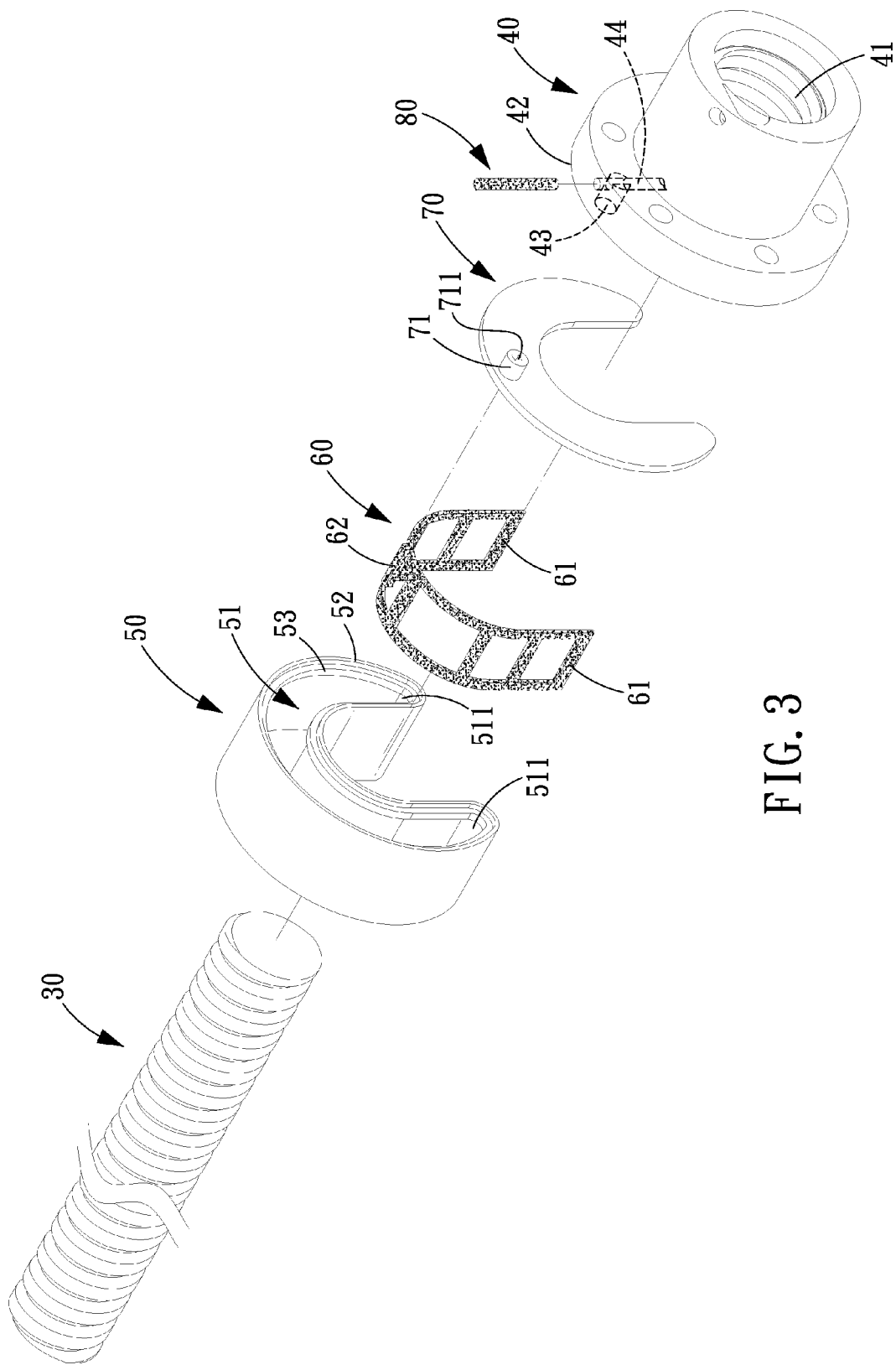
FIG. 3 is an exploded view of a lubricating device with heating function in accordance with a first embodiment of the present invention.
Figure 4:
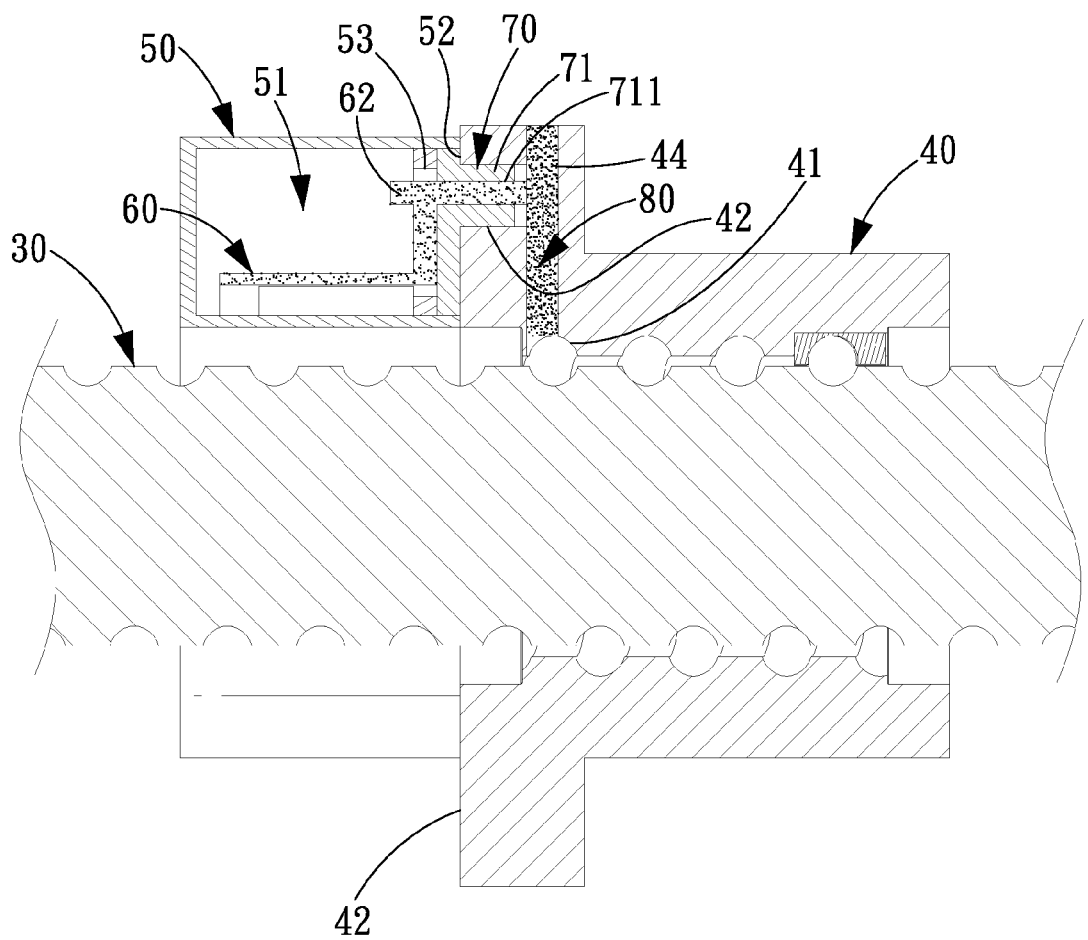
FIG. 4 is an assembly cross sectional view of the lubricating device with heating function in accordance with the first embodiment of the present invention.

Referring to FIGS. 3 and 4, a lubricating device with heating function used in cooperation with an elongated shaft 30 and a movable member 40, in accordance with a first embodiment of the present invention comprises: an oil tank 50, an oil guiding member 60 and a heat conduction member 70.

The oil tank 50 comprises an oil-reserving space 51 and an opening 52 in communication with the oil-reserving space 51. The oil-reserving space 51 includes two ends 511, and around the inner edge of the oil tank 50 is formed a flange 53.

The oil guiding member 60 is formed to fit in the oil-reserving space 51 and has two ends 61 inserted in the two ends 511 of the oil tank 50 and a discharging portion 62 extending out of the oil-reserving space 51. The oil guiding member 60 is made of wool felt or other materials with capillarity properties.

The heat conduction member 70 is formed to fit in the opening 52 of the oil tank 50 and is provided with a conduction portion 71 in which being defined a through hole 711. The heat conduction member 70 is abutted against the flange 53 to seal the opening 52 of the oil tank 50. The oil guiding member 60 is in contact with the heat conduction member 70 in such a manner that the discharging portion 62 of the oil guiding member 60 is inserted through the through hole 711 of the conduction portion 71 of the heat conduction member 70. The heat conduction member 70 is made of aluminum, copper or other materials with heat conduction properties and has higher heat conductivity than the oil tank 50. The heat conduction member 70 is fixed to the opening 52 of the oil tank 50 by glue, screw or any possible means. The heat conduction member 70 of this embodiment is a plate.

The movable member 40 is formed with a hole 41 for insertion of the elongated shaft 30 and movable with respect to the elongated shaft 30. The elongated shaft 30 of this embodiment is a screw, and the movable member 40 is a nut. The movable member 40 comprises an end surface 42 and is further formed with a first conduction hole 43 and a second conduction hole 44 in communication with each other, and the second conduction hole 44 is in communication with the hole 41 of the movable member 40. The lubricating device is mounted on the end surface 42 of the movable member 40 in such a manner that the heat conduction member 70 of the lubricating device is abutted against the end surface 42 of the movable member 40, the conduction portion 71 is inserted in the first conduction hole 43 of the movable member 40, and the discharging portion 62 that inserts in and extends out of the conduction portion 71 is also inserted in the first conduction hole 43. Then a lubricating member 80 is inserted in the second conduction hole 44 and brought into contact with the discharging portion 62 and the elongated shaft 30.

When in use, in the oil tank 50 can be stored high viscous lubrication so that, at normal temperature, no capillary action will occur in the oil guiding member 60, namely, at normal temperature, the oil guiding member 60 is unable to draw lubrication from the oil tank 50 to the lubricating member 80, as so to prevent oil leakage from occurring when the movable member 40 is not moving.

When the movable member 40 moves along the elongated shaft 30, the relative motion between the elongated shaft 30 and the movable member 40 makes the movable member 40 generate heat energy which will be absorbed by the heat conduction member 70 abutted against the movable member 40. Then the heat energy will be transmitted to the lubrication inside the oil tank 50 by the heat conduction member 70, so that viscosity of the lubrication will be reduced due to the lubrication is heated, and consequently, the heated and reduced-in-viscosity lubrication can easily be absorbed by the oil guiding member 60 by capillary action. Namely, when the movable member 40 moves along the elongated shaft 30, the oil guiding member 60 starts to have capillary action and draw the lubrication from the oil tank 50 to the lubricating member 80 through the discharging portion 62, so that the lubricating member 80 is able to lubricate the elongated shaft 30.

It is clear that when there is no relative motion between the movable member 40 and the elongated shaft 30, the movable member 40 and the elongated shaft 30 are at normal temperature, and the lubrication in the oil tank 50 has a high viscosity, so that no capillary action occurs and therefore no lubrication can be drawn. Contrariwise, when the movable member 40 moves relative to the elongated shaft 30 and heat energy is generated, the viscosity of the lubrication in the oil tank 50 will be reduced, and the oil guiding member 60 start to absorb lubrication. By such arrangements, the lubricating device of the present invention is capable of controlling start and stop of the action of lubrication transmission by itself without using any other control device. Further, the present invention is capable of stopping the lubrication from being continuously absorbed and transmitted when there is no relative motion between the movable member 40 and the elongated shaft 30, thus preventing lubrication leakage. Moreover, the oil guiding member 60 has two ends 61 inserted in the two ends 511 of the oil tank 50, which ensures that the lubrication inside the oil tank 50 can be absorbed until the last drop.

Figure 5:
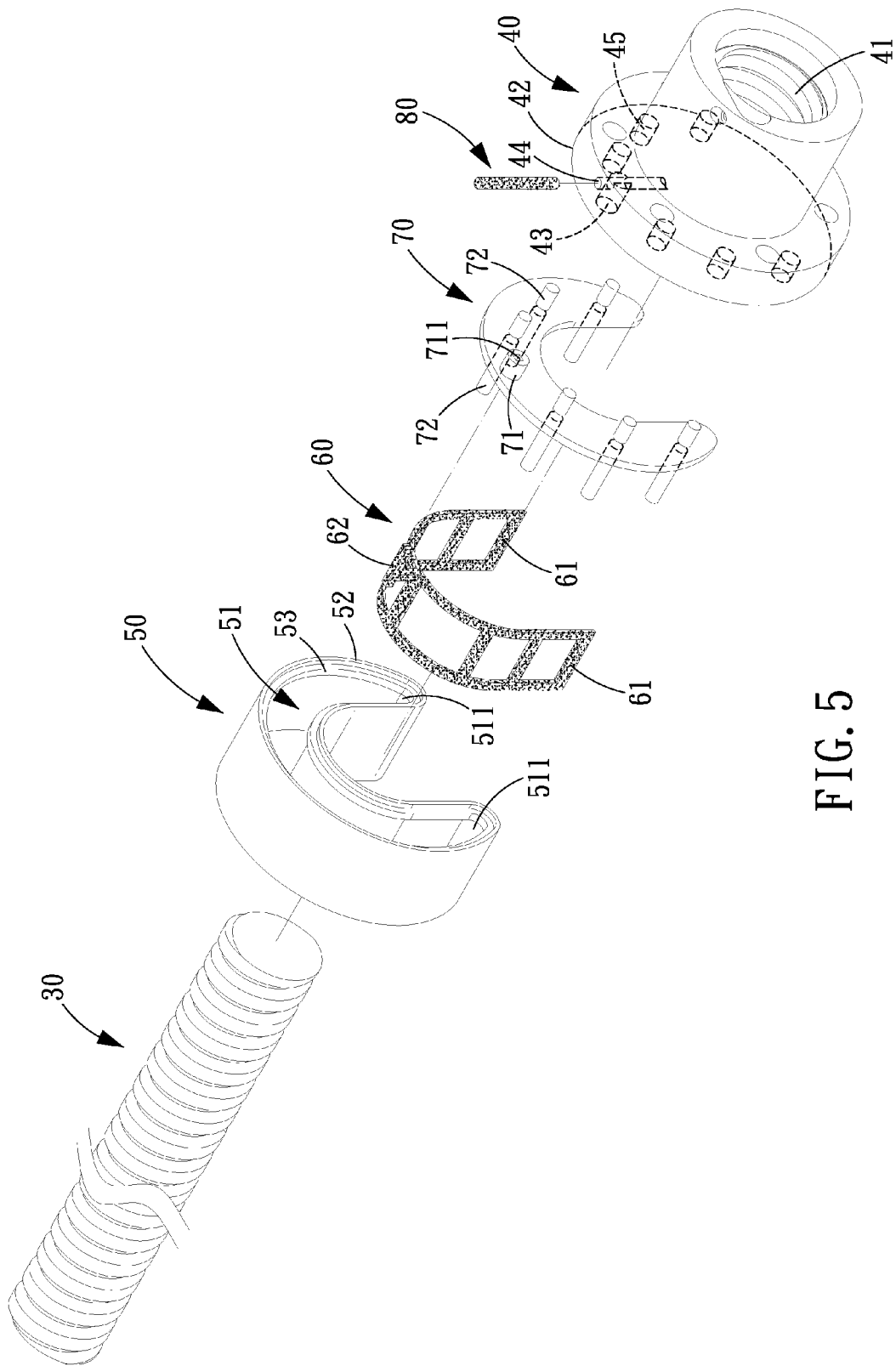
FIG. 5 is an exploded view of a lubricating device with heating function in accordance with a second embodiment of the present invention.
Figure 6:
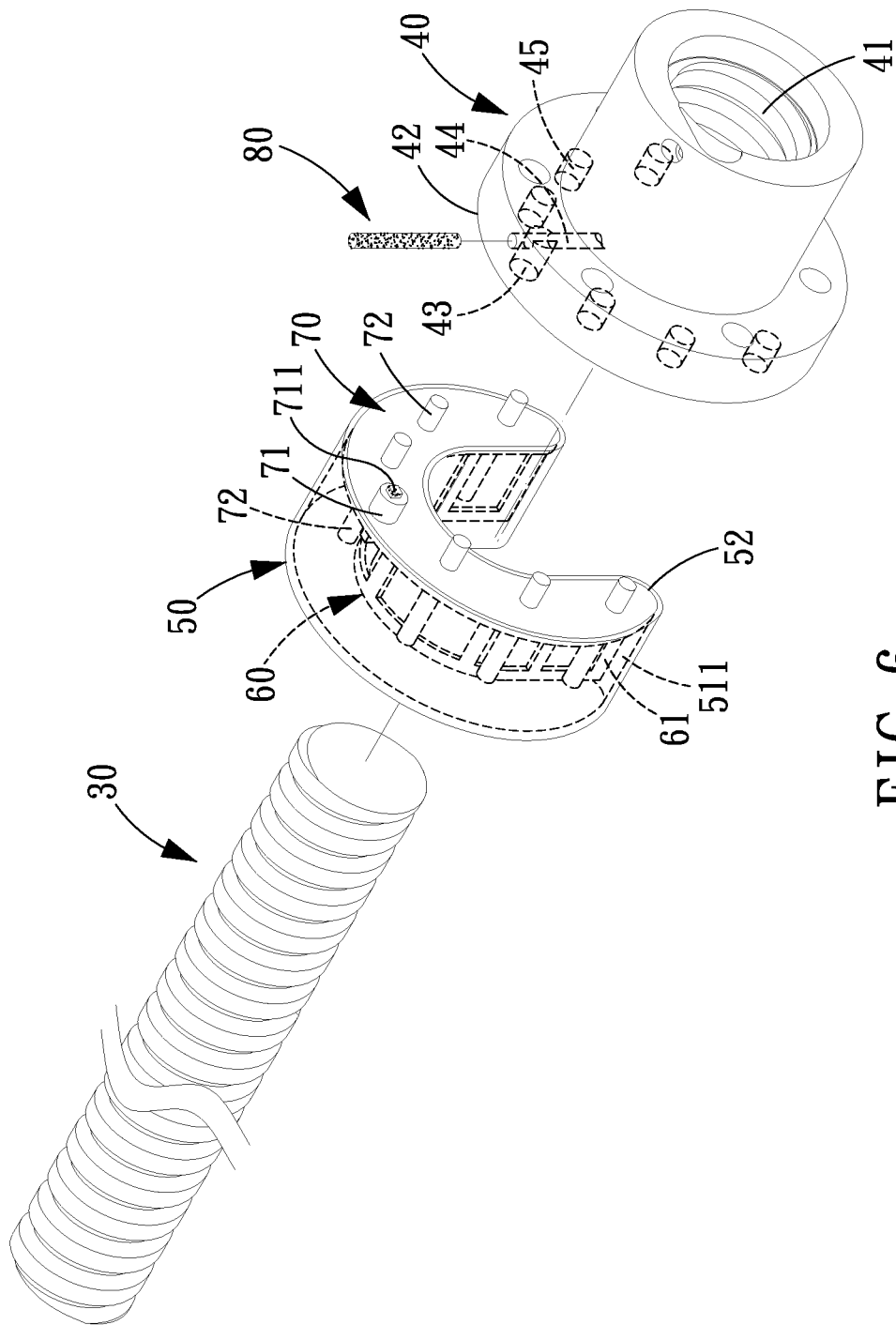
FIG. 6 is another exploded view the lubricating device with heating function in accordance with the second embodiment of the present invention.

Referring then to FIGS. 5 and 6, a lubricating device in accordance with a second embodiment of the present invention is similar to the first embodiment except that: the heat conduction member 70 is formed at both sides thereof with a plurality of heat conduction protrusions 72 which are to be inserted through a plurality of inserting holes 45 a plurality of inserting holes 45 formed in the end surface 42 of the movable member 40 and into the oil tank 50, so that the heat conduction areas of the heat conduction member 70 for absorbing the heat energy of the movable member 40 and for transmitting heat energy to the lubrication inside the oil tank 50 are increased considerably, namely, heat conduction efficiency is consequently increased.

Figure 7:
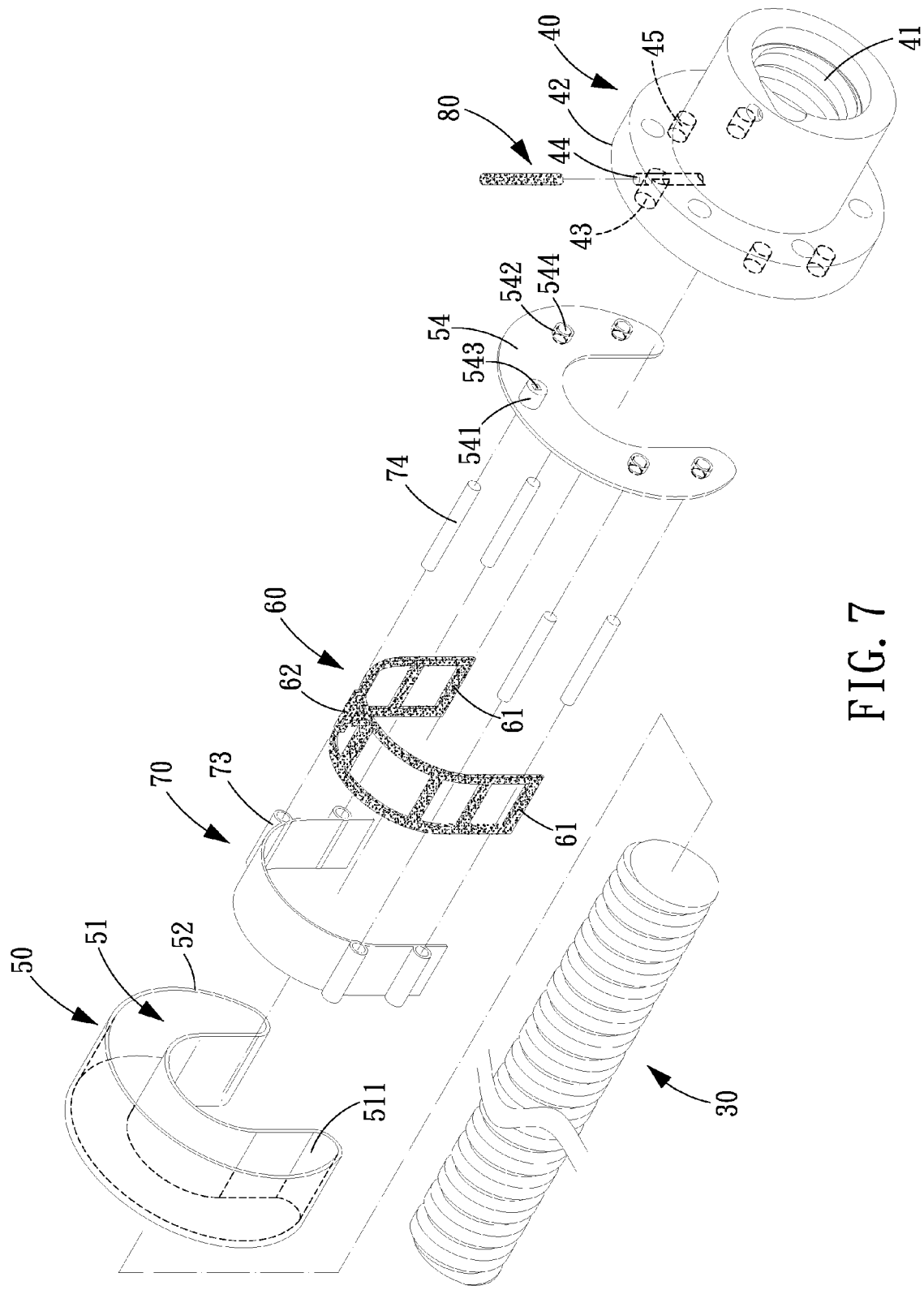
FIG. 7 is an exploded view of a lubricating device with heating function in accordance with a third embodiment of the present invention.
Figure 8:
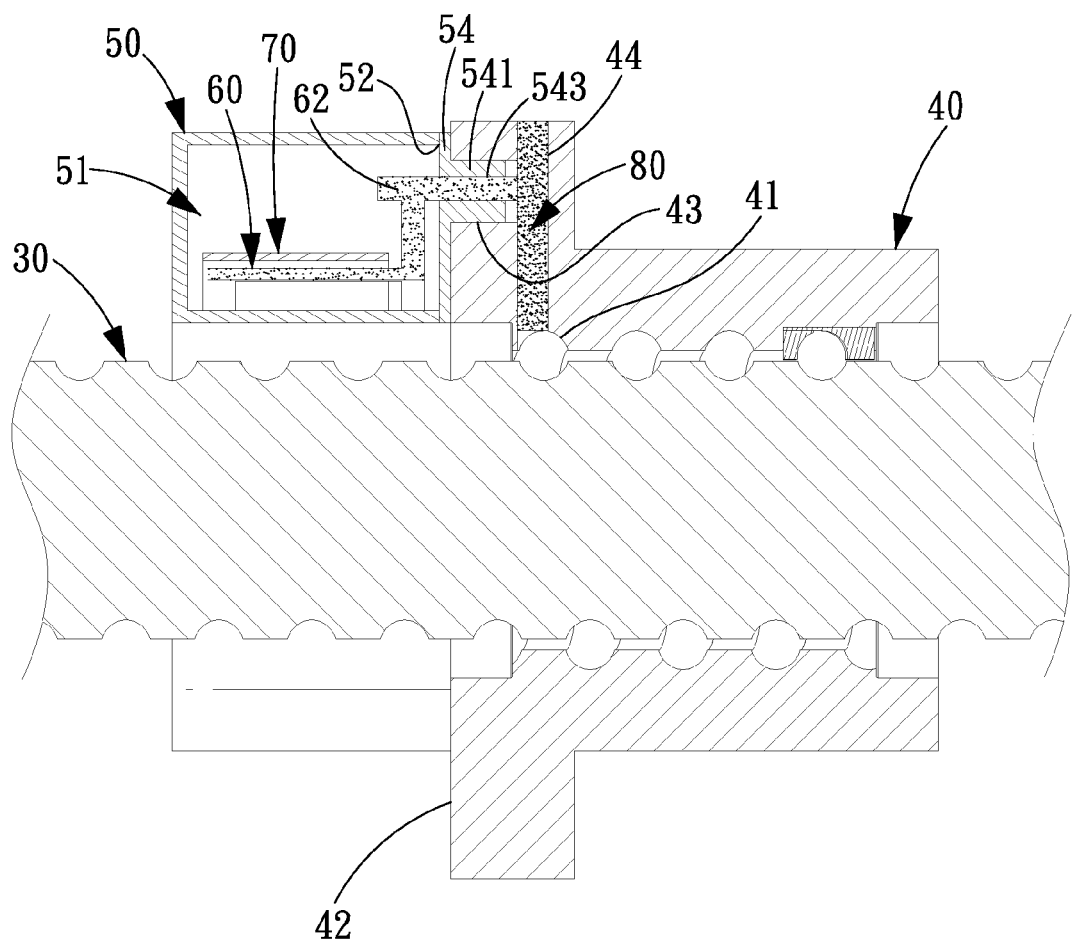
FIG. 8 is a cross section view of FIG. 7.
Figure 9:
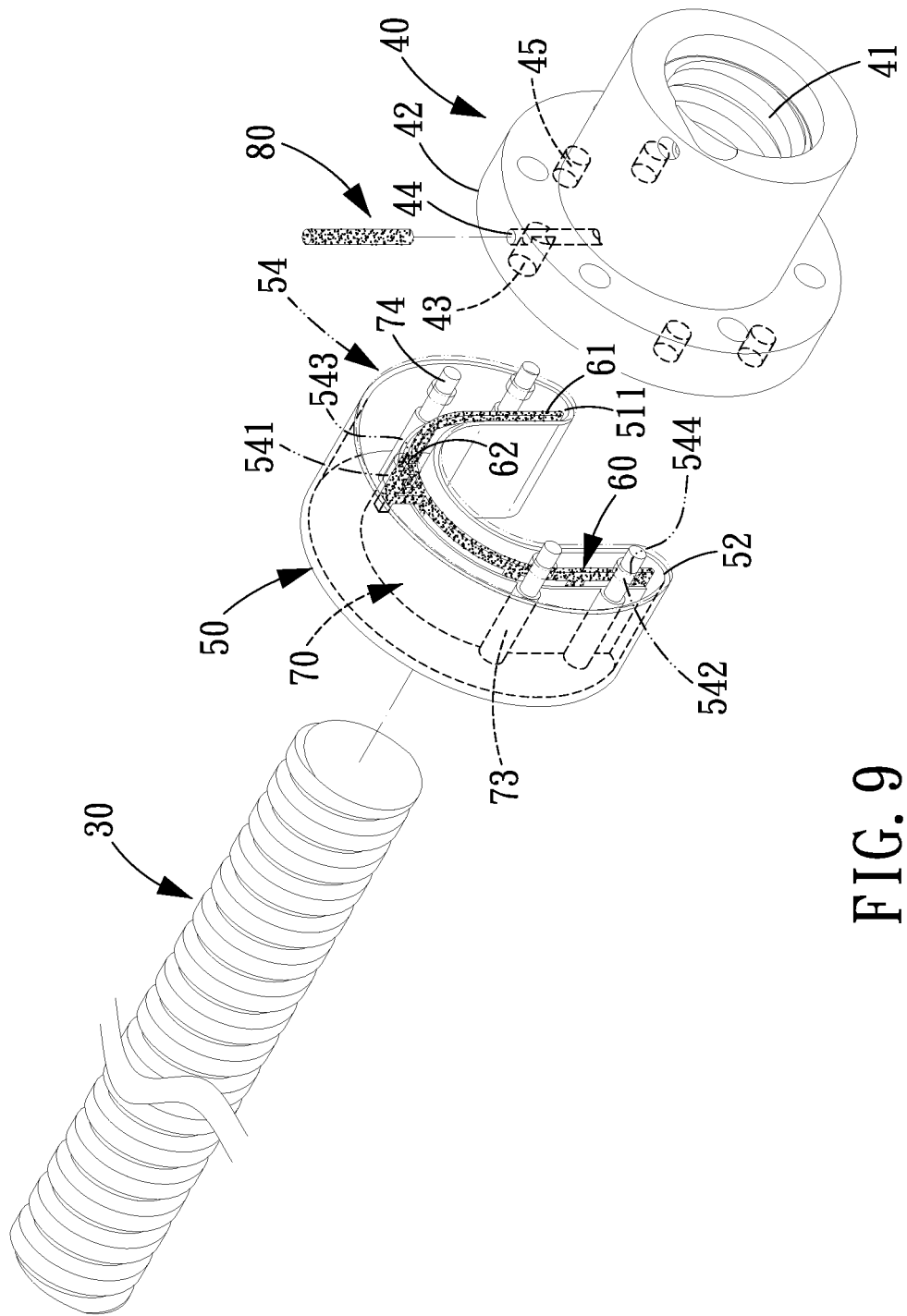
FIG. 9 is a perspective view of FIG. 7.

Referring then to FIGS. 7-9, a lubricating device in accordance with a second embodiment of the present invention is similar to the first embodiment except that: the heat conduction member 70 is formed with a plurality of inserting portions 73 in the form of hollow cylinders for insertion of a plurality of heat conduction rods 74 in such a manner that the heat conduction rods 74 each has one end inserted in the oil-reserving space 51.

Besides, the oil tank 50 is further provided with a cover 54 which is provided on one side thereof with a first conduction portion 541 and a plurality of second conduction portions 542. The first and second conduction portions 541, 542 each have a through hole 543, 544. The end surface 42 of the movable member 40 is formed with a plurality of inserting holes 45 for insertion of the heat conduction rods 74. The opening 52 of the oil tank 50 is sealed with the cover 54 in such a manner that the discharging portion 62 of the oil guiding member 60 is inserted through the through hole 543 of the first conduction portion 541 and into the first conduction hole 43 of the movable member 40. By such arrangements, the heat conduction rods 74 are able to draw the heat energy generated by the movable member 40 to the heat conduction member 70 disposed inside the oil tank 50.

While we have shown and described various embodiments in accordance with the present invention, it is clear to those skilled in the art that further embodiments may be made without departing from the scope of the present invention.

What is claimed is:

1. A lubricating device with heating function used in cooperation with an elongated shaft and a movable member, the movable member being formed with a hole for insertion of the elongated shaft and including an end surface and further formed with a first conduction hole and a second conduction hole in communication with each other, and the second conduction hole being in communication with the hole of the movable member, the lubricating device comprising:
    an oil tank including an oil-reserving space and an opening in communication with the oil-reserving space;
    an oil guiding member formed to fit in the oil-reserving space and having a discharging portion extending out of the oil-reserving space;
    a heat conduction member in form a plate fixed at the opening of the oil tank and being provided with a conduction portion, the oil guiding member being in contact with the heat conduction member in such a manner that the discharging portion of the oil guiding member is inserted through the conduction portion of the heat conduction member, and the heat conduction member is abutted against the end surface of the movable member; and
    a lubricating member inserted in the second conduction hole and brought into contact with the discharging portion and the elongated shaft,
    wherein the heat conduction member is formed at both sides thereof with a plurality of heat conduction protrusions which are to be inserted through a plurality of inserting holes a plurality of inserting holes formed in the end surface of the movable member and into the oil tank.

2. The lubricating device with heating function as claimed in claim 1, wherein a flange is formed around an inner edge of the oil tank, and the heat conduction member is abutted against the flange.

3. The lubricating device with heating function as claimed in claim 1, wherein the heat conduction member is formed to fit in the opening of the oil tank and fixed to the opening of the oil tank by glue, screw or any possible means.

4. The lubricating device with heating function as claimed in claim 1, wherein the heat conduction member is made of aluminum, copper or other metal.

5. The lubricating device with heating function as claimed in claim 1, wherein the heat conduction member has higher heat conductivity than the oil tank.

6. A lubricating device with heating function used in cooperation with an elongated shaft and a movable member, the movable member being formed with a hole for insertion of the elongated shaft and including an end surface and further formed with a first conduction hole and a second conduction hole in communication with each other, and the second conduction hole being in communication with the hole of the movable member, the lubricating device comprising:

an oil tank including an oil-reserving space and being disposed at the end surface of the movable member;

an oil guiding member formed to fit in the oil-reserving space and having a discharging portion inserted through the oil-reserving space and into the first conduction hole;

a heat conduction member received in the oil-reserving space of the oil tank and being provided with a conduction portion, the oil guiding member being in contact with the heat conduction member, the heat conduction member having a plurality of heat conduction rods inserted through the inserting holes; and a lubricating member inserted in the second conduction hole and brought into contact with the discharging portion and the elongated shaft.

7. The lubricating device with heating function as claimed in claim 6, further comprises a cover to seal an opening of the oil tank is sealed with the cover, the cover is provided on one side thereof with a first conduction portion and a plurality of second conduction portions, the discharging portion of the oil guiding member is inserted through the first conduction portion and into the first conduction hole of the movable member, and the heat conduction rods are inserted through the second conduction portions and into the inserting holes.

8. The lubricating device with heating function as claimed in claim 6, wherein the heat conduction member is made of aluminum, copper or other metal and is formed to fit in the oil-reserving space of the oil tank.

9. The lubricating device with heating function as claimed in claim 6, wherein the heat conduction member is formed with a plurality of inserting portions in the form of hollow cylinders for insertion of a plurality of heat conduction rods.

10. The lubricating device with heating function as claimed in claim 6, wherein the heat conduction member has higher heat conductivity than the oil tank.

* * * * *